(No Model.)  2 Sheets—Sheet 1.
J. N. HUBBELL.
SAFETY SWITCH FOR RAILWAYS.
No. 347,805. Patented Aug. 24, 1886.
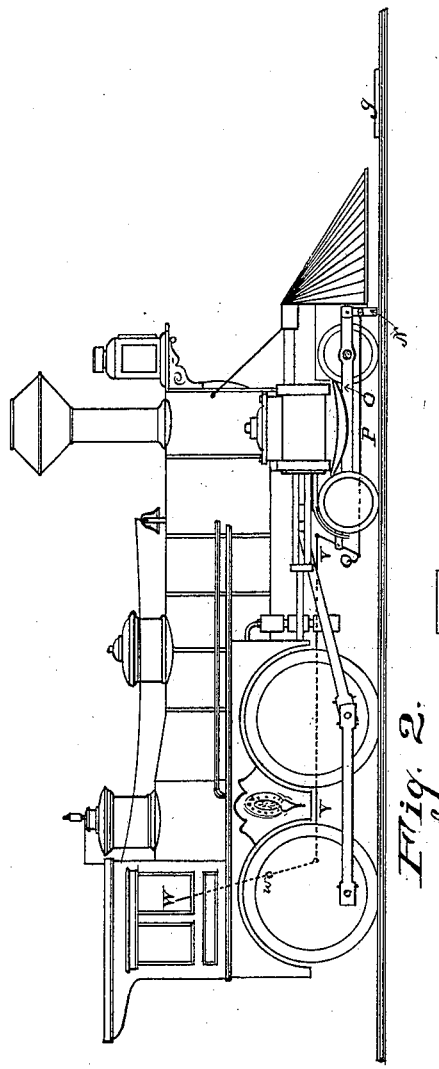
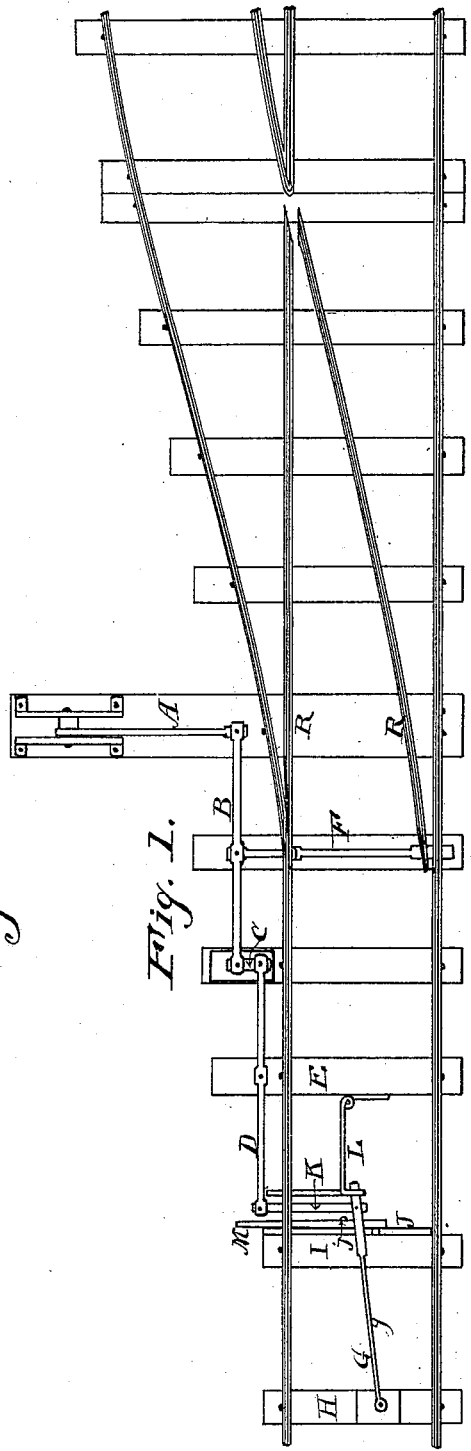
Witness
J. R. Tibbitts
Ida M. Warren
Inventor,
John N. Hubbell.
By Geo. W. Tibbitts Atty

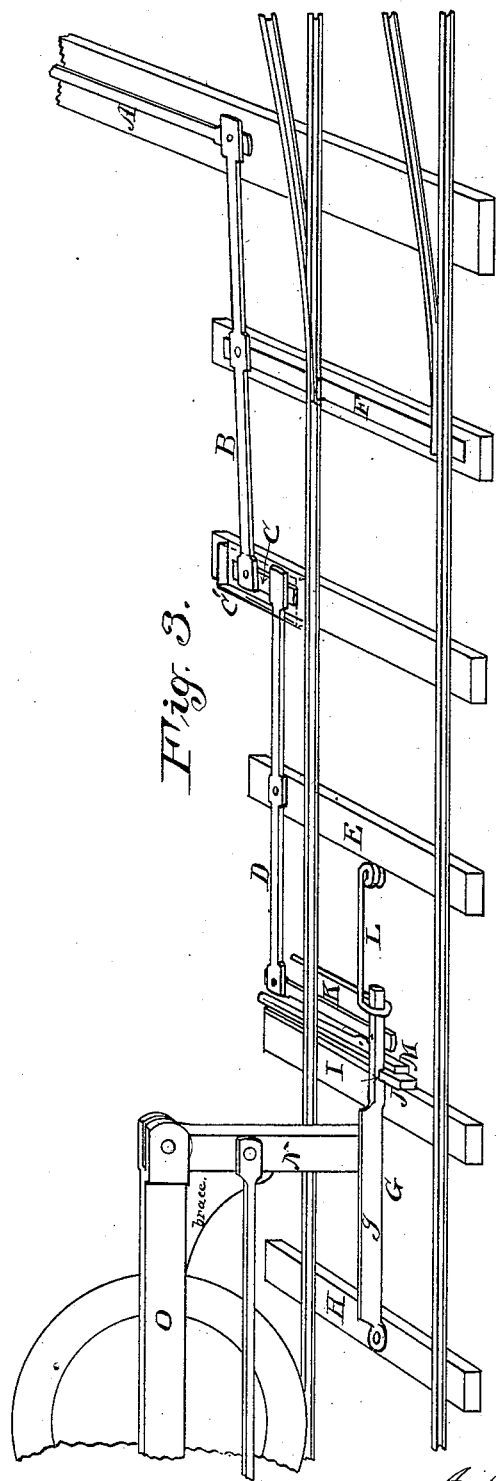

United States Patent Office.

JOHN N. HUBBELL, OF BEDFORD, OHIO.

SAFETY-SWITCH FOR RAILWAYS.

SPECIFICATION forming part of Letters Patent No. 347,805, dated August 24, 1886.

Application filed May 19, 1886. Serial No. 202,689. (No model.)

*To all whom it may concern:*

Be it known that I, JOHN N. HUBBELL, of Bedford, in the county of Cuyahoga and State of Ohio, have invented certain new and useful Improvements in Safety-Switches for Railroads, of which the following is a specification.

This invention has for its object to provide a means of changing or setting a switch by the engineer of a locomotive, in case of need, while the said locomotive is running at full speed; and it consists of the combination and arrangement of devices in connection with a railway-switch, as hereinafter fully described, and pointed out in the claims.

In the accompanying drawings, Figure 1 is a plan view of a railway track and switch, showing the arrangement of my devices for moving the switch-track in its relation with the ordinary hand switching device. Fig. 2 is a side elevation of a locomotive, showing the means connected therewith for operating the aforesaid new switching device. Fig. 3 is a perspective view of a railway-track, showing my switch-shifting apparatus as being operated by the locomotive attachment.

A represents the usual hand switching device, which, instead of being connected directly with the switch-track, is connected to the end of a lever, B. The opposite end of said lever B is connected by a link, C, to a second lever, D, which is pivoted at its middle part to a cross-tie, E. The middle part of said first lever, B, is connected to the switch-bar F, that carries the switch-rails R R. The link C and the ends of levers B and D are inclosed in a box or housing, C', which limits the movement of the link end of lever B within it. The lever D is fulcrumed at its middle to tie E, and the bar G being held in the notch in bar J the lever D is firmly held, so that the link forms a fulcrum, on which the lever B turns in the operation of the hand switching apparatus.

G is a strong iron bar, having a perpendicular flange, *g*, and is pivoted with a strong bolt to a cross-tie, H, between the two rails of the main track, a little to the right side of the center line of road-bed. The moving end of said bar G lies upon the next cross-tie, I, to which is attached an iron bar, J, having a notch in which the bar G rests when the switch is open for the main track. This notch is used to catch the bar G when it is thrown over by the locomotive. At all other times the bar G lies out of the notch ready for action by the locomotive whenever needed. The movable end of said bar G is connected by a link-bar, K, with the end of the lever D. L is a spring-bar hooked to the end of the said lever G, for a purpose hereinafter shown.

M is a lever pivoted to the side of the bar J, at *j*, its long arm reaching out under the track-rail and its short arm extending under the bar G. This lever M is for releasing the bar G from the notch in bar J when required for setting the device so that it will be operated upon by the locomotive attachment.

Attached to the locomotive is a swinging arm, N, pivoted to a strong bar, O, attached to the central part of the axles of the forward truck, extending forward so as to bring said arm underneath the pilot and just back of the cow-catcher. To the said arm N is pivoted a rod, P, reaching backward to rear end of the truck, where it is connected to the lower end of a rocking lever, Q, pivoted at its middle to a support on rear end of bar O. The upper end of said rocking lever is connected by a long rod, V, to the lower end of a hand-lever, W, pivoted at *w* to side of the locomotive, the upper end reaching up into the cab in convenient position for the engineer to handle. This completes the description.

The operation of my device is as follows: The position of the lever G shown in Fig. 3 is that into which it is thrown or pushed by the bar N on the locomotive in the act of setting the switch. The pushing aside of said bar G draws link K, thereby acting on lever D, the other end of which pushes link C outward, carrying the lever B, which works on its pivotal connection with bar A. This movement draws the bar F outward, carrying the switch-rails R R over, as desired. This movement is performed by the engineer in case he should discover that the switch was left open through neglect or otherwise, which would be indicated by the position of the target. After the train has passed the bar G is released from the notch by a pressure on the outer end of the lever M. Then the spring L throws said bar G to the left. The end of lever D, with the link C, is moved toward the rail. The device is kept in this position in readiness for the engineer to operate as occasion may require at all times, and the hand operating is capable of being operated independently of the other device at all times whether said device is in either position.

It is the intention to have my auxiliary switching device set low enough in the ties so that it may be covered over with planking, leaving only the flange *g* projecting above for protection from interference by clogging with dirt or being tampered with by meddlesome persons.

The arm N, when not wanted for use, is turned upward and forward by the rod P, connected, as hereinbefore described, with the hand-lever in the cab, and may be quickly turned down by the engineer by the same means, and when down rests against a strong brace depending from the bar O.

Having described my invention, I claim—

1. In a safety-switch for railways, the combination, with the hand switch-shifting device A and bar B, of the auxiliary switch-operating device consisting of a link, C, connecting said lever B with a lever, D, which is fulcrumed at its middle to a cross-tie, and connected by a link-bar, K, to the track-lever G, having attached the spring lever L, hand-lever M, and notched bar J, all constructed and arranged to be operated by a pendent arm, N, from a locomotive, substantially as described.

2. The combination, with the locomotive, of the swinging pendent arm N, pivoted to a bar, O, secured to the forward truck, said arm N being connected by rod P to a rocking lever, Q, connected with and operated by rod V, attached to hand-lever W, reaching from the cab, all constructed to operate as and for the purpose specified.

JOHN N. HUBBELL.

Witnesses:
D. B. DUNHAM,
J. S. GREEN.